(12) United States Patent
Chen et al.

(10) Patent No.: US 7,736,059 B2
(45) Date of Patent: Jun. 15, 2010

(54) LINEAR MOTION GUIDE APPARATUS HAVING CHANGEABLE WIPER

(75) Inventors: Tsung Jen Chen, Taichung (TW); Chiung Hui Tsai, Taichung (TW)

(73) Assignee: Hiwin Technologies Corp., Situn Taichung (TW)

( * ) Notice: Subject to any disclaimer, the term of this patent is extended or adjusted under 35 U.S.C. 154(b) by 828 days.

(21) Appl. No.: 11/647,119

(22) Filed: Dec. 27, 2006

(65) Prior Publication Data

US 2008/0159669 A1 Jul. 3, 2008

(51) Int. Cl.
*F16C 29/06* (2006.01)
(52) U.S. Cl. .......................................... 384/15; 384/45
(58) Field of Classification Search .................. 384/15, 384/43, 44, 45; 277/550, 568, 908
See application file for complete search history.

(56) References Cited

U.S. PATENT DOCUMENTS

| | | | |
|---|---|---|---|
| 4,886,376 A | 12/1989 | Osawa | 384/15 |
| 5,634,722 A | 6/1997 | Yuasa et al. | 384/15 |
| 5,775,813 A * | 7/1998 | Saitoh | 384/15 |
| 6,106,154 A * | 8/2000 | Agari | 384/15 |
| 6,123,338 A * | 9/2000 | Edelmann et al. | 277/551 |
| 6,558,039 B2 * | 5/2003 | Wu | 384/45 |
| 6,715,920 B2 * | 4/2004 | Menges et al. | 384/45 |

* cited by examiner

*Primary Examiner*—Thomas R Hannon
*Assistant Examiner*—James Pilkington
(74) *Attorney, Agent, or Firm*—Charles E. Baxley

(57) ABSTRACT

A linear motion guide device includes a slider slidably attached onto a guide rail, an end cap and a wiper attached to the slider, the wiper includes one or more catches engaged with the end cap for anchoring the wiper to the end cap, and includes one or more spring-biased latches for resiliently engaging with the end cap and for detachably anchoring the wiper to the end cap and for allowing the wiper to be easily and readily attached to the end cap or disengaged from the end cap without additional tools, the wiper includes one or more levers for resiliently supporting the spring-biased latch.

12 Claims, 10 Drawing Sheets

LINEAR MOTION GUIDE APPARATUS HAVING CHANGEABLE WIPER

BACKGROUND OF THE INVENTION

1. Field of the Invention

The present invention relates to a linear motion guide apparatus, and more particularly to a linear motion guide apparatus including a wiper designed and arranged to be easily and readily attached to or disengaged from the linear motion guide apparatus without additional tools.

2. Description of the Prior Art

Typical linear motion guide devices comprise a slider or slide block slidably attached onto a guide rail, and normally, a ball bearing device disposed between the slider and the guide rail for facilitating the sliding movement between the slider and the guide rail and for allowing the slider and the guide rail to be smoothly moved relative to each other.

For example, U.S. Pat. No. 4,886,376 to Osawa discloses one of the typical linear motion rolling guide units comprising a slider or slide block slidably attached onto a guide rail, and a dust proof seal attached onto the slide block and having a soft rubber member for engaging with the guide rail and for making a tight seal between the slide block and the guide rail and for wiping off the dust or particles or the like that may be engaged into the space formed between the slide block and the guide rail.

However, the dust proof seal is normally solidly secured onto an end cap or the slide block with four or more fasteners, and it takes a long time to fasten and to unfasten the fasteners onto and from the dust proof seal.

U.S. Pat. No. 5,634,722 to Yuasa et al., and U.S. Pat. No. 6,106,154 to Agari disclose two further typical linear motion rolling guide units each also comprising a slider or slide block slidably attached onto a guide rail, and one or more end seals or wiper devices attached onto the slide block or the end caps and having a soft rubber lips or lip portions for engaging with the guide rail and for making a tight seal between the slide block and the guide rail and for wiping off the dust or particles or the like that may be engaged into the space formed between the slide block and the guide rail.

However, similarly, the dust proof wipers or end seals are also solidly secured onto the end cap or the slide block with four or more fasteners, and it will also take a long time to fasten and to unfasten the fasteners onto and from the dust proof seal.

The present invention has arisen to mitigate and/or obviate the afore-described disadvantages of the conventional linear motion guide devices.

SUMMARY OF THE INVENTION

The primary objective of the present invention is to provide a linear motion guide apparatus including a wiper designed and arranged to be easily and readily attached to or disengaged from the linear motion guide apparatus without additional tools.

In accordance with one aspect of the invention, there is provided a linear motion guide apparatus comprising a guide rail, a slider slidably attached onto the guide rail for moving along the guide rail, an end cap attached to the slider, and a wiper including a wiping member having a channel formed therein for slidably receiving and engaging the guide rail, and including at least one catch extended therefrom for engaging with the end cap and for anchoring and positioning the wiper to the end cap, and including at least one spring-biased latch extended from the wiper for resiliently engaging with the end cap and for detachably anchoring and positioning the wiper to the end cap without tools.

The catch is preferably extended downwardly from the wiper. The wiper includes at least one lever provided therein, and the spring-biased latch is extended from the lever for resiliently engaging with the end cap.

The lever of the wiper includes two legs extended therefrom and attached to the wiper for forming a U-shaped structure. The wiper includes at least one compartment formed therein and the lever is disposed in the compartment of the wiper.

The end cap includes a depression formed therein and defined by an outer peripheral wall, and includes at least one notch formed therein and communicating with the depression of the end cap for partially exposing the lever of the wiper.

The wiper includes a wiping member attached to an inner peripheral portion of the wiper for resiliently engaging with the guide rail. The wiping member includes a groove formed in an inner peripheral portion of the wiping member for forming an inner peripheral flange. The wiping member includes an inclined surface formed in the inner peripheral flange for forming a resilient structure to the inner peripheral flange of the wiper.

The end cap includes at least one lock passage formed therein for engaging with the catch of the wiper. The end cap includes at least one conduit formed therein and communicating with the lock passage of the end cap for forming a lock shoulder between the lock passage and the conduit of the end cap and for engaging with the catch of the wiper.

The end cap includes at least one cavity formed therein for engaging with the spring-biased latch of the wiper. The end cap includes a depression formed therein and defined by an outer peripheral wall, the cavity of the end cap is formed in the outer peripheral wall. The spring-biased latch includes an inclined surface formed therein for engaging with the end cap.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
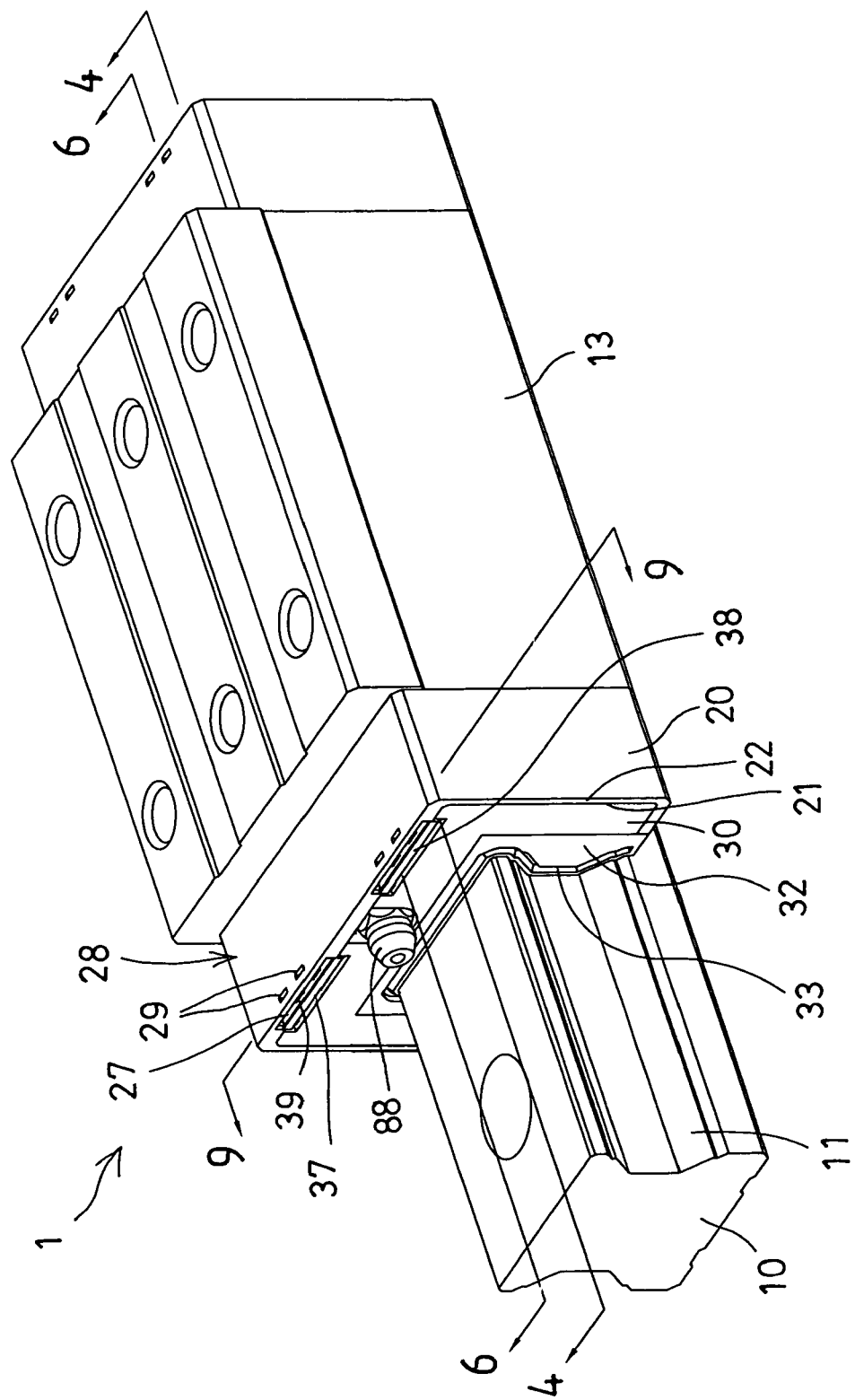
FIG. 1 is a perspective view of a linear motion guide apparatus in accordance with the present invention.
Figure 2:
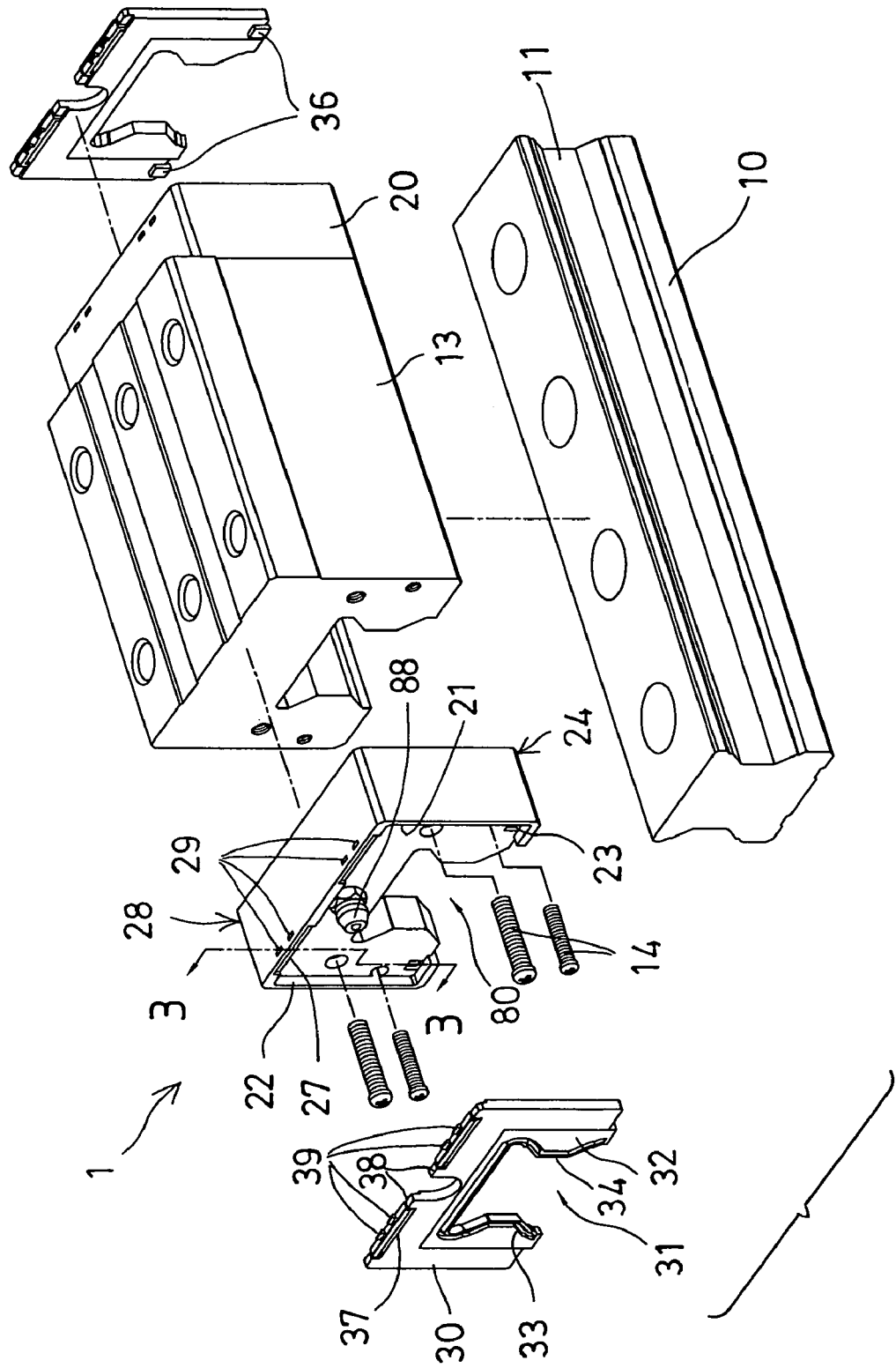
FIG. 2 is a partial exploded view of the linear motion guide apparatus.

Referring to the drawings, and initially to FIGS. 1-2, and 9-10, a linear motion guide apparatus 1 in accordance with the present invention comprises a guide rail 10 including a substantially I-shaped cross section having two longitudinal recesses 11 formed in the side portions thereof, and a slide block or a slider 13 slidably attached onto the guide rail 10 and arranged to be moved along the guide rail 10, and normally, a ball bearing device (not shown) disposed between the slider 13 and the guide rail 10 for facilitating the sliding movement between the slider 13 and the guide rail 10 and for allowing the slider 13 and the guide rail 10 to be smoothly moved relative to each other. Two end caps 20 are disposed on the two sides or end portions or outer portions of the slider 13 and attached or secured to the slider 13 with such as fasteners 14 (FIG. 2) respectively.

The linear motion guide apparatus 1 in accordance with the present invention further includes two dust caps or wipers 30 disposed on the outer portions of the end caps 20 and to be detachably attached or secured onto the end caps 20 without additional tools. The ball bearing device (not shown) and the slider 13 are not related to the present invention and will not be described in further details. The end caps 20 each include a channel 80 formed in the lower portion thereof (FIGS. 2, 6-8) for slidably receiving or engaging onto the guide rail 10, and a depression 21 formed therein, such as formed in the outer portion thereof and facing away from the slider 13, and formed and defined by an outer peripheral wall 22. One of the end caps 20 may include a mouth 88 attached thereto (FIGS. 1-2, 9-10) for such as filling lubricant into the end caps 20 and for lubricating the ball bearing device (not shown).

Figure 3:
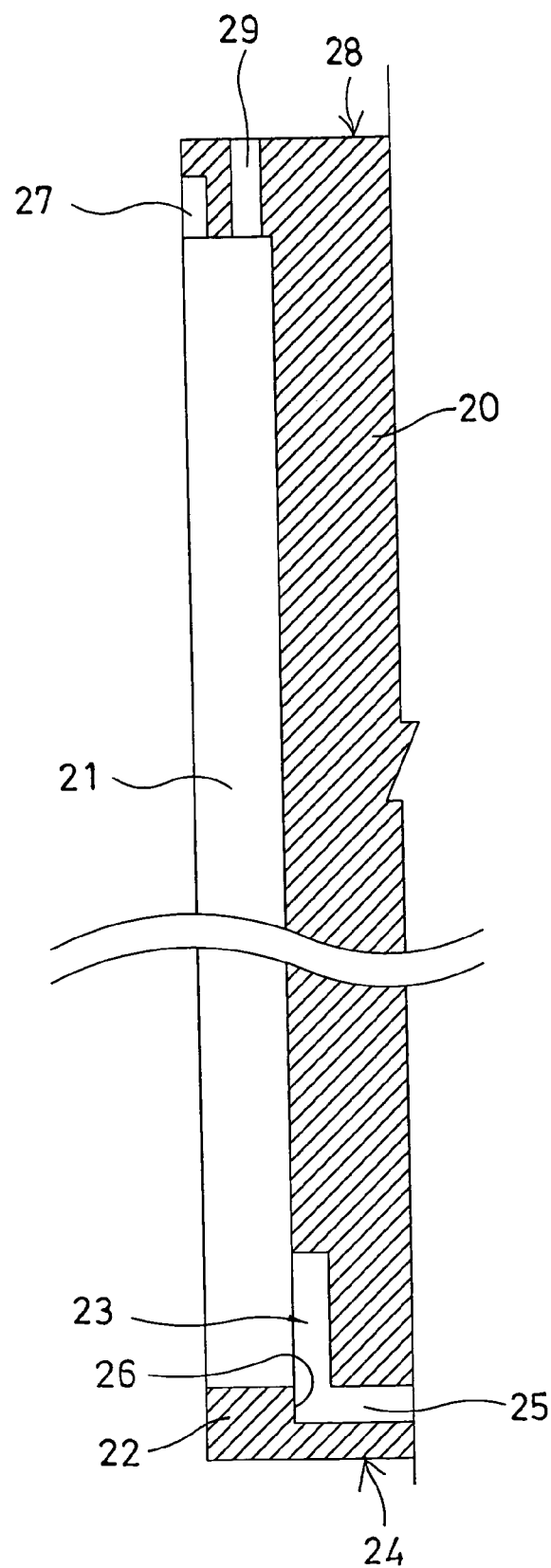
FIG. 3 is a cross sectional view of the linear motion guide apparatus taken along lines 3-3 of FIG. 2.

The end caps 20 each further include one or more (such as two) lock passages 23 formed in the lower portion 24 thereof and communicating with the depression 21 of the end cap 20 (FIGS. 2-5, 9-10), and one or more (such as two) conduits 25 also formed in the lower portion 24 thereof, and communicating with the respective lock passages 23 thereof (FIGS. 3-5) for forming or defining a lock shoulder 26 between the respective lock passage 23 and the conduit 25 of the end cap 20. The end caps 20 each further include one or more (such as two) notches 27 formed in the upper portion 28 thereof and communicating with the depression 21 of the end cap 20 (FIGS. 1-8), and one or more (such as two) cavities 29 also formed in the upper portion 28 thereof and communicating with the depression 21 of the end cap 20 (FIGS. 3, 6-10), but offset or spaced away from the notches 27 of the end cap 20. For example, the notches 27 and the cavities 29 are formed in the outer peripheral wall 22 of the end cap 20.

The wipers 30 each also include a channel 31 formed in the lower portion thereof (FIGS. 2, 9-10) for slidably receiving or engaging onto the guide rail 10, and a substantially inverted U-shaped wiping member 32 attached to or formed in the inner peripheral portion thereof and for softly or resiliently engaging with the guide rail 10 and for wiping off the dust or particles or the like that may be engaged into the space formed between the slide block 13 and the guide rail 10. It is preferable that the channel 31 is formed in the lower portion of the wiping member 32 and having a shape corresponding to that of the guide rail 10 for snugly and softly or resiliently engaging onto the guide rail 10. The wipers 30 is preferably made of the plastic or rubber materials softer than that for the wiping members 32.

As shown in FIGS. 1-2, 6-8, the wipers 30 each include a groove 33 formed in the inner peripheral portion thereof for forming or defining an inner peripheral flange 34, and an inclined surface 35 formed in the lower or inner portion of the inner peripheral flange 34 or the wiper 30 for forming a resilient structure to the inner peripheral flange 34 of the wiper 30 and for allowing the inner peripheral flange 34 of the wiper 30 to further softly or resiliently engaging with the guide rail 10. The wipers 30 each include a catch 36 extended therefrom, such as extended downwardly therefrom (FIGS. 2, 9-10) for engaging into the corresponding or the respective lock passage 23 of the end cap 20 and for engaging with the respective lock shoulder 26 of the end cap 20 (FIGS. 4-5), and thus for solidly anchoring and positioning the lower portion of the wiper 30 to the end cap 20 and for preventing the wiper 30 from being disengaged from the end cap 20.

Figure 5:
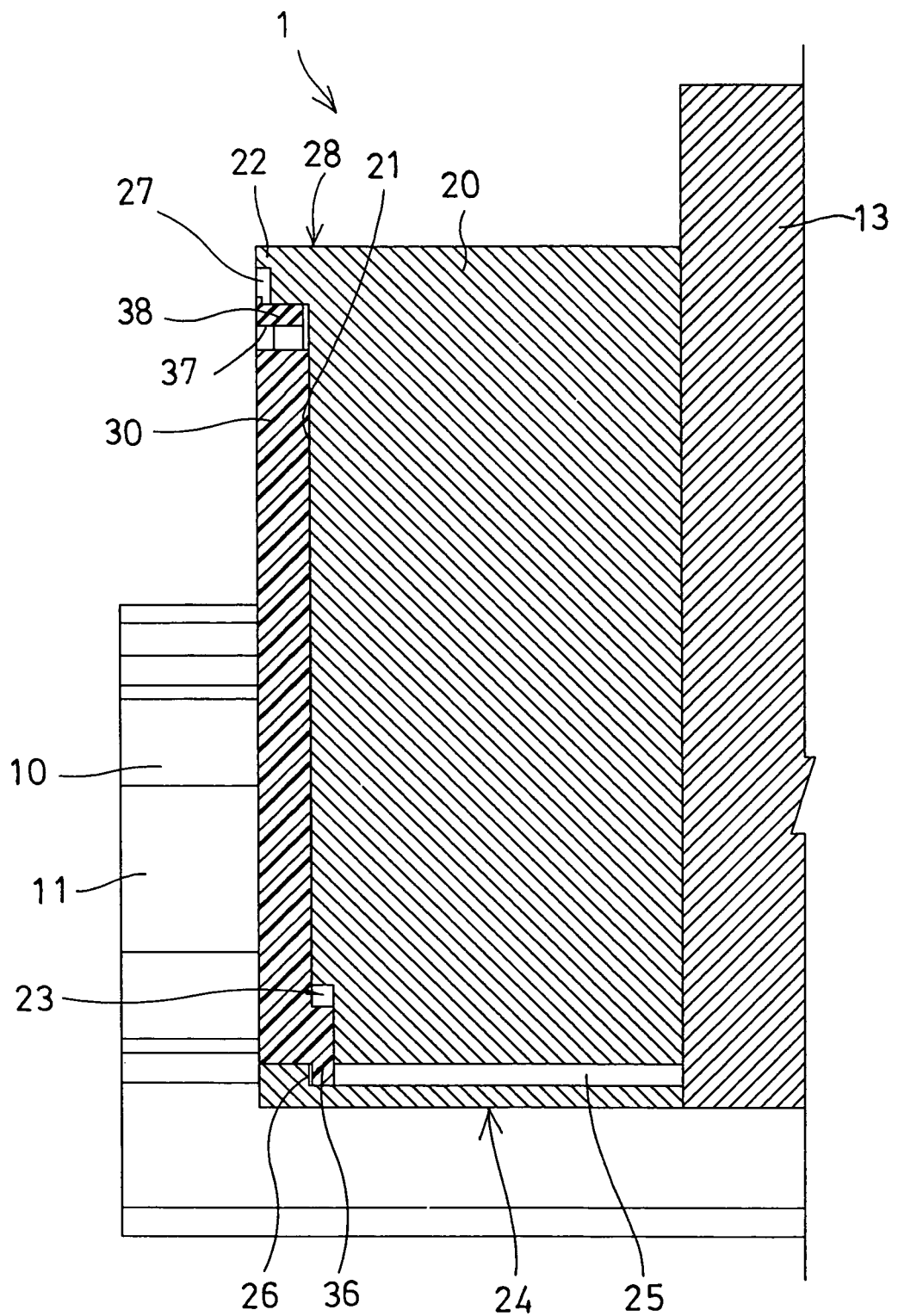
FIG. 5 is a cross sectional view similar to FIG. 4, illustrating the operation of the linear motion guide apparatus.
Figure 6:
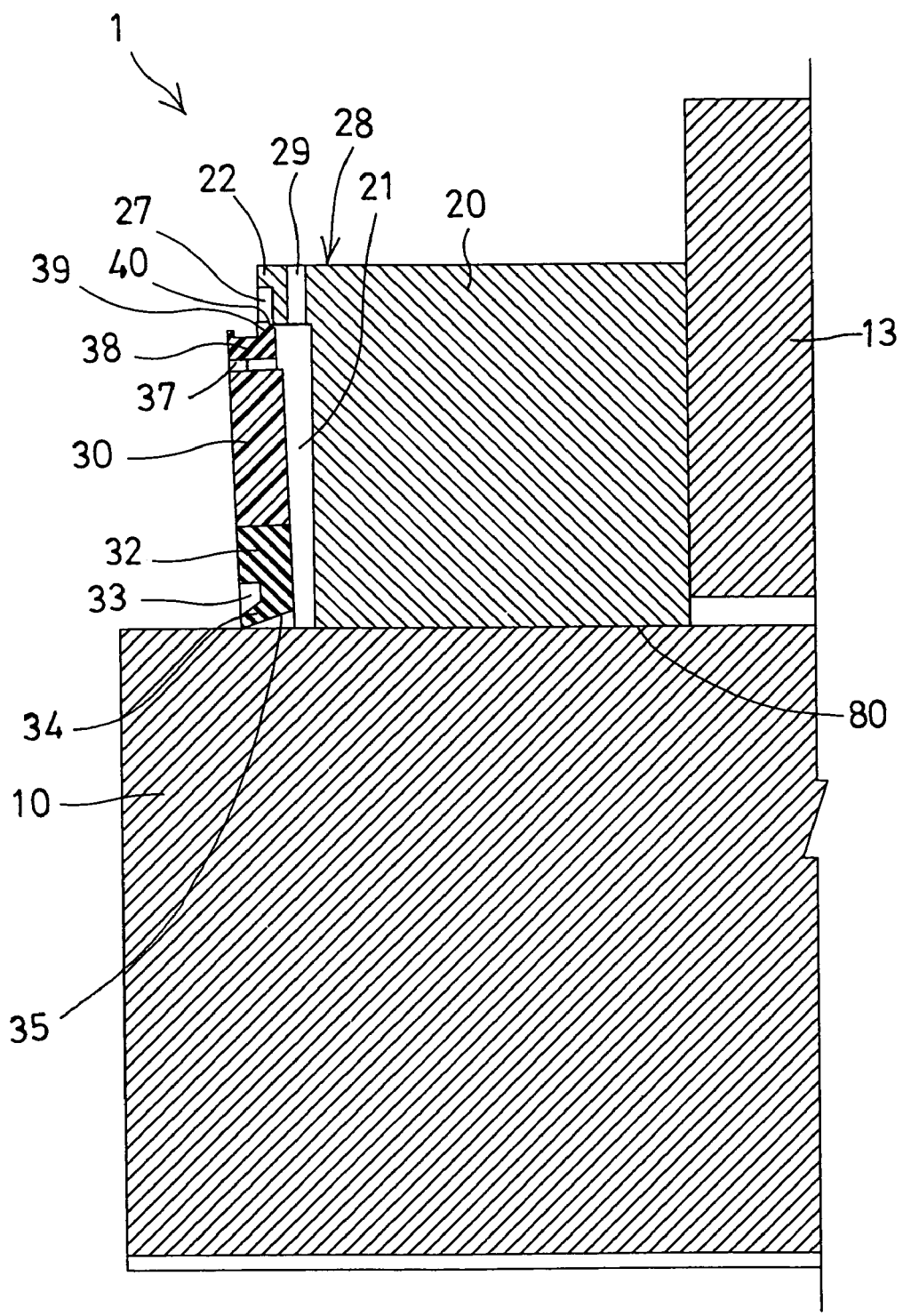
FIG. 6 is a cross sectional view of the linear motion guide apparatus taken along lines 6-6 of FIG. 1.
Figure 7:
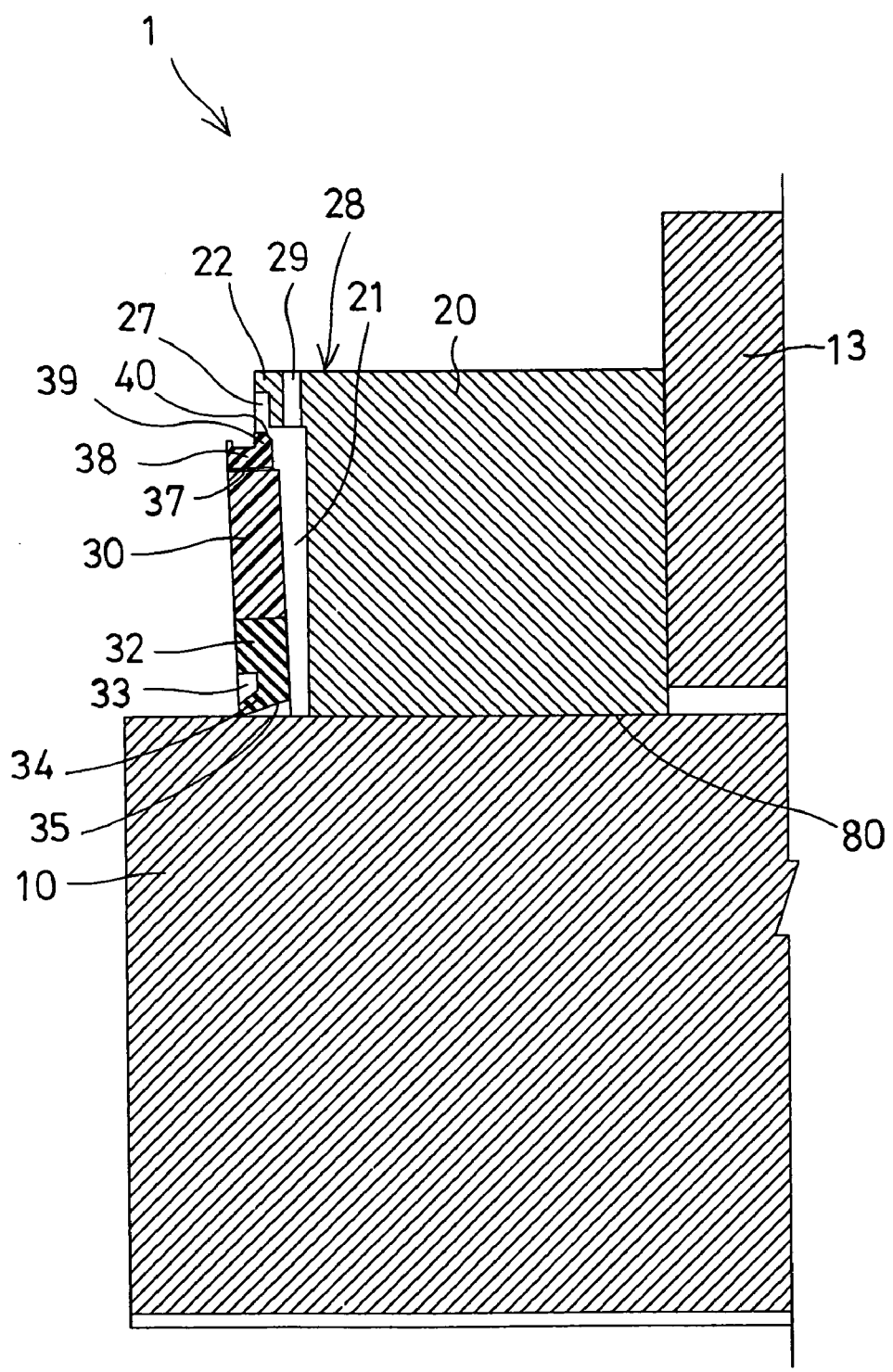
FIGS. 7, 8 are cross sectional views similar to FIG. 6, illustrating the operation of the linear motion guide apparatus.
Figure 8:
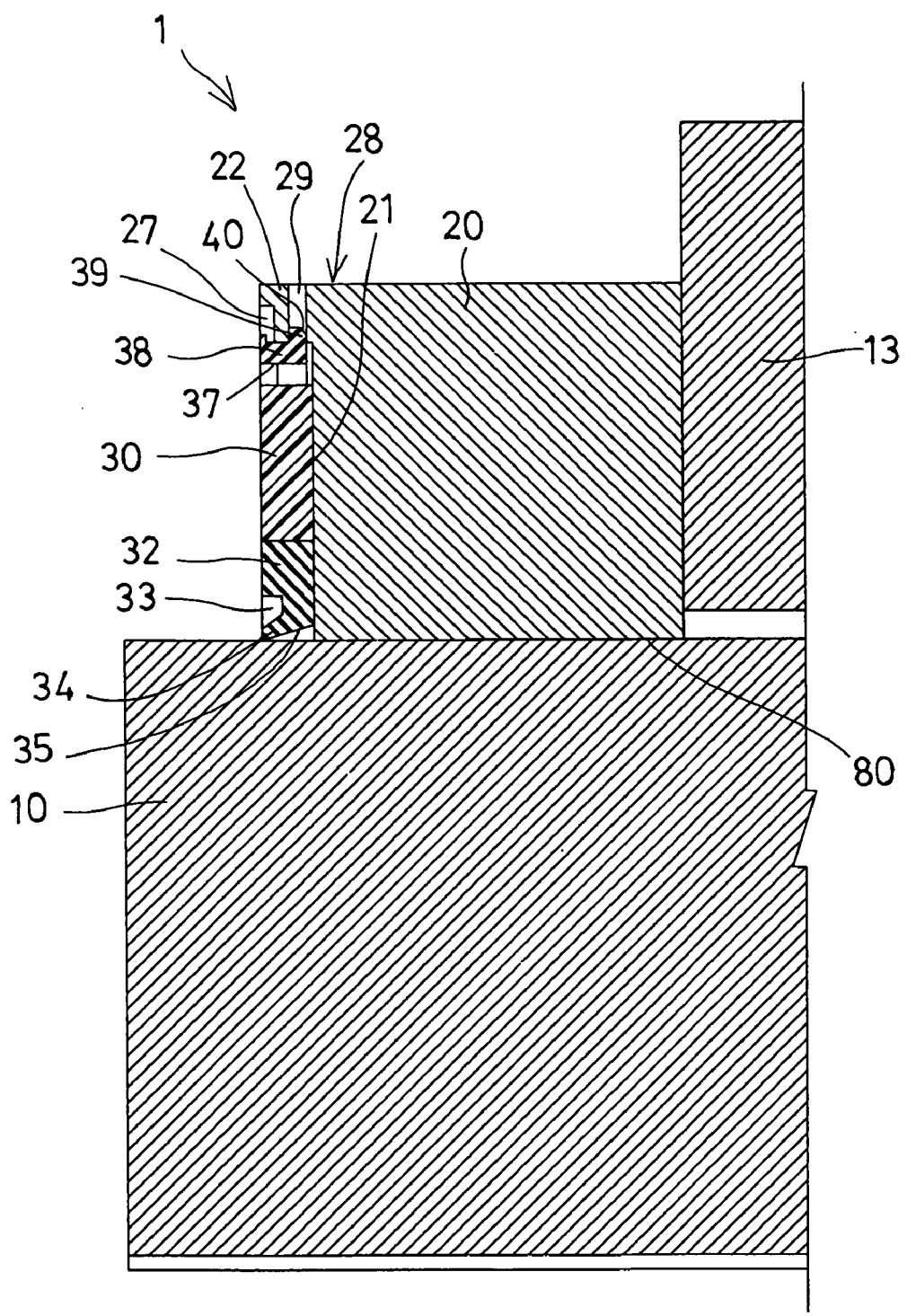
Figure 9:
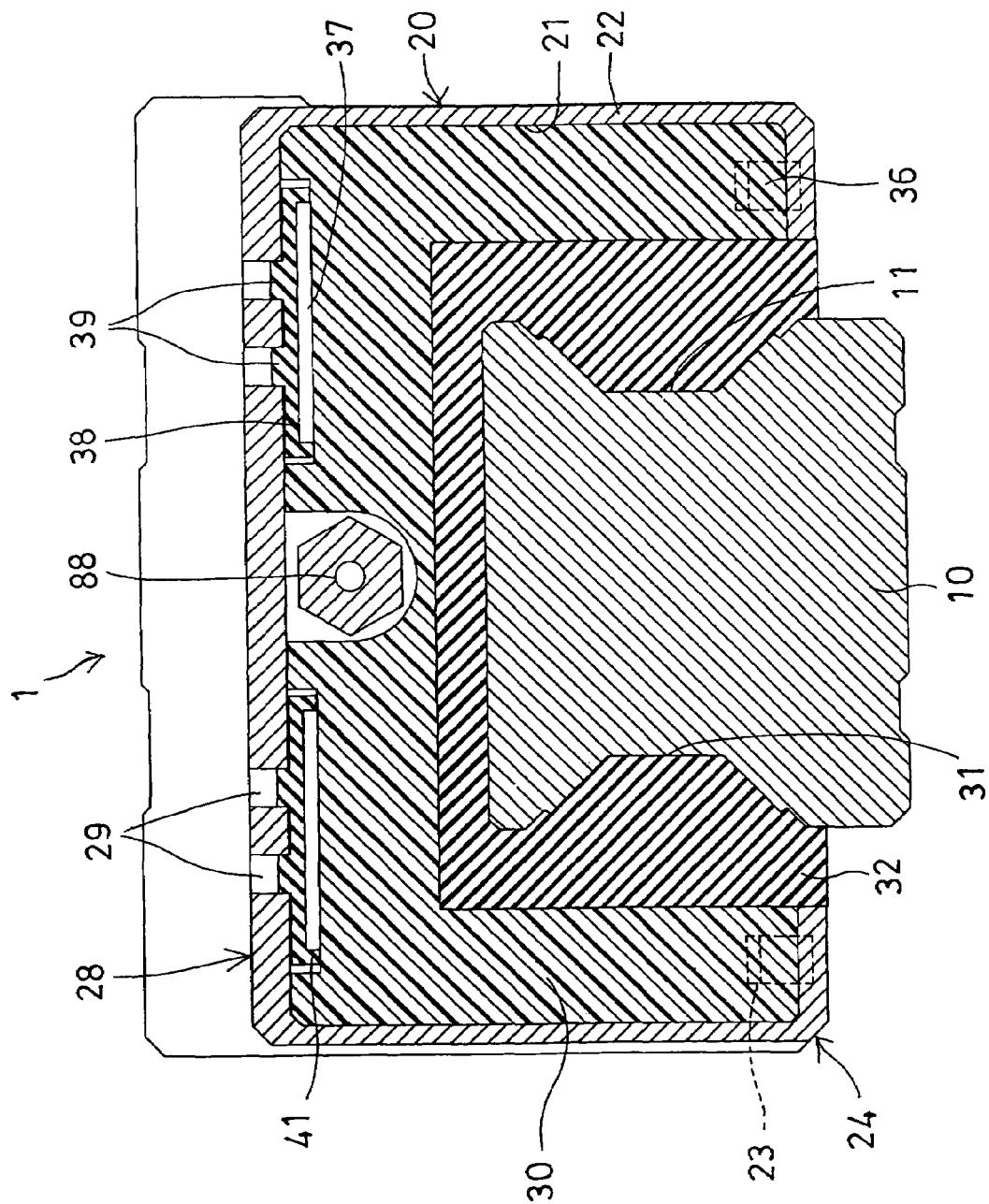
FIG. 9 is a cross sectional view of the linear motion guide apparatus taken along lines 9-9 of FIG. 1.
Figure 10:
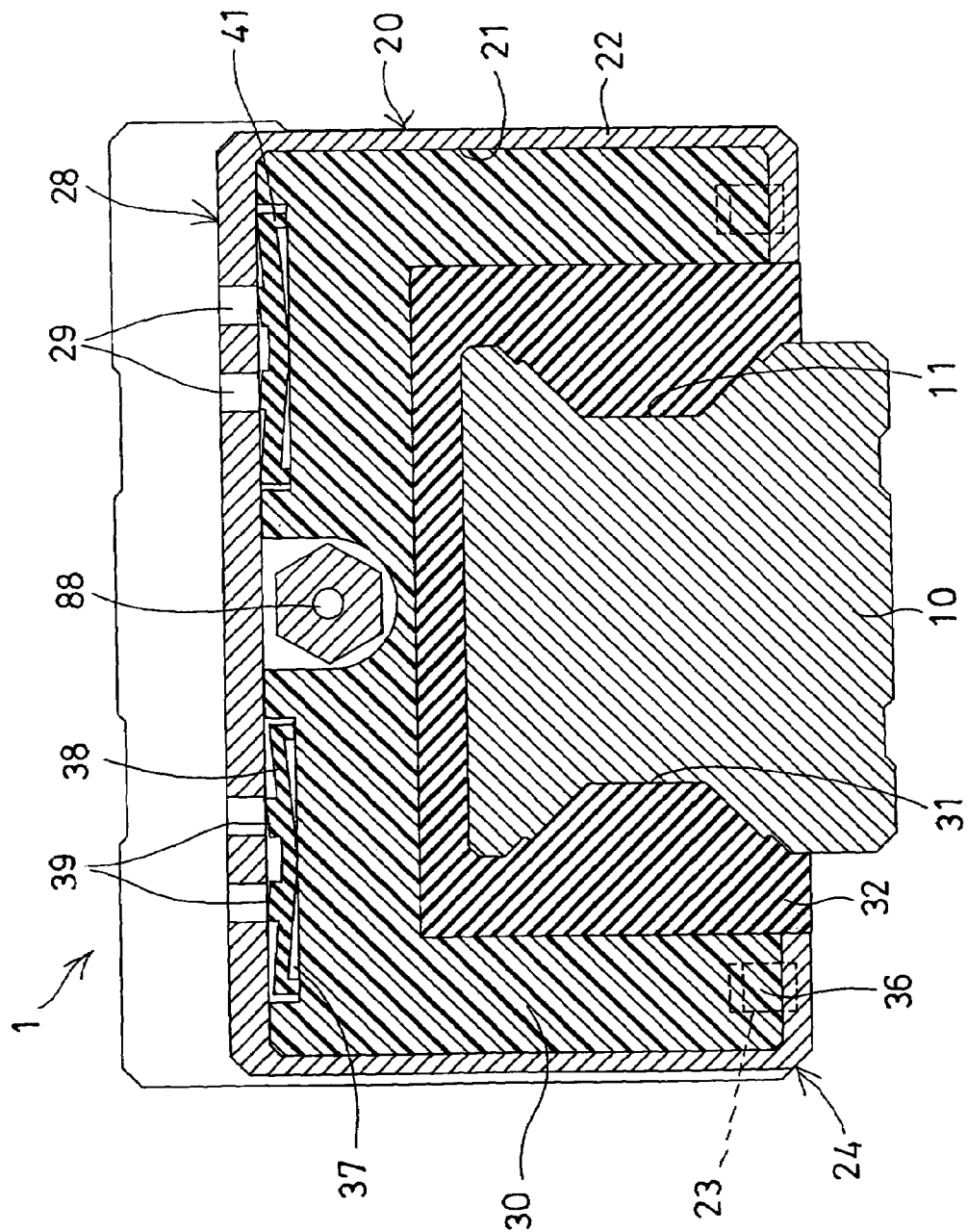
FIG. 10 is a cross sectional view similar to FIG. 9, illustrating the operation of the linear motion guide apparatus.

The wipers 30 each further include one or more (such as two) voids or compartments 37 formed in the upper portion thereof and a resilient arm or lever 38 formed or provided in each of the compartments 37 of the wiper 30, and one or more (such as two) projections or latches 39 extended from each of the levers 38 for forming a spring-biased latch 39 and for resiliently engaging into the respective cavities 29 of the end cap 20 (FIGS. 1, 6-10), and for detachably anchoring and positioning the upper portion of the wiper 30 to the end cap 20. The upper portion of the wiper 30 may be selectively disengaged form the end cap 20 when the levers 38 and/or the latches 39 are depressed and disengaged form the cavities 29 of the end cap 20 (FIG. 10). It is preferable that the wiper 30 include an inclined surface 40 formed in each of the latches 39 (FIGS. 4-8) for allowing the latches 39 to be easily and smoothly engaged into the cavities 29 of the end cap 20 (FIGS. 6-8).

It is preferable that the levers 38 and/or the latches 39 are made of the plastic or rubber materials softer than that for the wiper 30 for allowing the levers 38 and/or the latches 39 to be suitably depressed and disengaged form the cavities 29 of the end cap 20, and for allowing the latches 39 to be easily and smoothly engaged into or disengaged from the cavities 29 of the end cap 20. For example, the latches 39 may be disengaged from the cavities 29 of the end cap 20 by depressing the levers 38 and/or the latches 39 downwardly or away from the outer peripheral wall 22 of the end cap 20 for allowing the upper portion of the wiper 30 to be selectively latched to or disengaged form the end cap 20 by the resilient levers 38 and/or latches 39 without additional tools. It is preferable that the levers 38 each further include two legs 41 extended therefrom and attached or molded or secured to the wiper 30 for forming a substantially inverted U-shaped structure (FIGS. 9-10).

Figure 4:
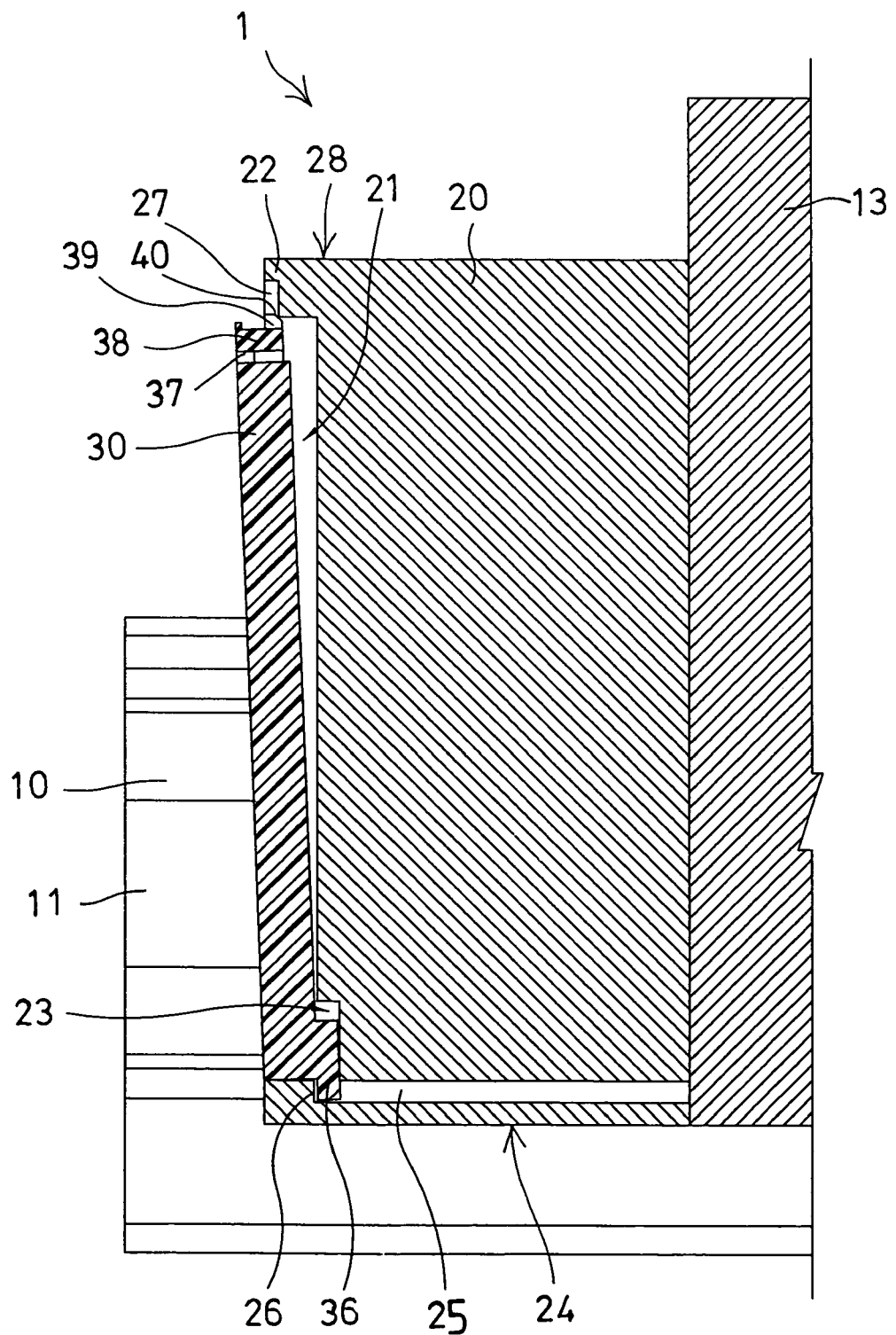
FIG. 4 is a cross sectional view of the linear motion guide apparatus taken along lines 4-4 of FIG. 1.

In operation, as shown in FIG. 4, the catches 36 of the wiper 30 may first be engaged into the lock passages 23 of the end cap 20 and engaged with the lock shoulders 26 of the end cap 20 for solidly anchoring and positioning the lower portion of the wiper 30 to the end cap 20. As shown in FIG. 7, the inclined surfaces 40 of the latches 39 may then be engaged with the outer peripheral wall 22 of the end cap 20 for allowing the levers 38 and/or the latches 39 to be suitably depressed by the outer peripheral wall 22 of the end cap 20 and to be engaged into the cavities 29 of the end cap 20 for detachably anchoring and positioning the upper portion of the wiper 30 to the end cap 20 and for allowing the upper portion of the wiper 30 to be disengaged from the cavities 29 of the end cap 20 by depressing the levers 38 and/or the latches 39 downwardly or away from the outer peripheral wall 22 of the end cap 20.

The formation and the provision of the notches 27 in the end cap 20 may partially expose the levers 38 (FIGS. 5, 8) for allowing the levers 38 to be suitably depressed by the users. It is to be noted that the wipers 3 may thus be easily and readily attached to or disengaged from the respective end cap 20 by the catches 36 and/or the levers 38 and/or the latches 39 of the wiper 30 without additional tools. It is further to be noted that the catches 36 may also be formed or extended from the side portions or the upper portion of the wiper 30, and the levers 38 and the latches 39 may also be formed or extended from the side portions or the lower portion of the wiper 30 and preferably formed or extended or located opposite to the catches 36 for easily and readily attaching or disengaging the wiper 30 from the end cap 20 without additional tools.

Accordingly, the linear motion guide apparatus in accordance with the present invention includes a wiper designed and arranged to be easily and readily attached to or disengaged from the linear motion guide apparatus without additional tools.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A linear motion guide apparatus comprising:
   a guide rail,
   a slider slidably attached onto said guide rail for moving along said guide rail,
   an end cap attached to said slider, and
   a wiper including a wiping member having a channel formed therein for slidably receiving and engaging said guide rail, and including at least one catch extended therefrom for engaging with said end cap and for anchoring and positioning said wiper to said end cap, and including at least one lever provided therein, and including at least one spring-biased latch extended from said at least one lever of said wiper for resiliently engaging with said end cap and for detachably anchoring and positioning said wiper to said end cap without tools, and said at least one lever of said wiper including two legs extended therefrom and attached to said wiper for forming a U-shaped structure.

2. The linear motion guide apparatus as claimed in claim 1, wherein said at least one catch is extended downwardly from said wiper.

3. The linear motion guide apparatus as claimed in claim 1, wherein said wiper includes at least one compartment formed therein and said at least one lever is disposed in said at least one compartment of said wiper.

4. The linear motion guide apparatus as claimed in claim 1, wherein said end cap includes a depression formed therein and defined by an outer peripheral wall, and includes at least one notch formed therein and communicating with said depression of said end cap for partially exposing said at least one lever of said wiper.

5. The linear motion guide apparatus as claimed in claim 1, wherein said wiper includes a wiping member attached to an inner peripheral portion of said wiper for resiliently engaging with said guide rail.

6. The linear motion guide apparatus as claimed in claim 5, wherein said wiping member includes a groove formed in an inner peripheral portion of said wiping member for forming an inner peripheral flange.

7. The linear motion guide apparatus as claimed in claim 6, wherein said wiping member includes an inclined surface formed in said inner peripheral flange for forming a resilient structure to said inner peripheral flange of said wiper.

8. The linear motion guide apparatus as claimed in claim 1, wherein said end cap includes at least one lock passage formed therein for engaging with said at least one catch of said wiper.

9. The linear motion guide apparatus as claimed in claim 1, wherein said end cap includes at least one cavity formed therein for engaging with said at least one spring-biased latch of said wiper.

10. The linear motion guide apparatus as claimed in claim 9, wherein said end cap includes a depression formed therein and defined by an outer peripheral wall, said at least one cavity of said end cap is formed in said outer peripheral wall.

11. The linear motion guide apparatus as claimed in claim 1, wherein said at least one spring-biased latch includes an inclined surface formed therein for engaging with said end cap.

12. A linear motion guide apparatus comprising:
   a guide rail,
   a slider slidably attached onto said guide rail for moving along said guide rail,
   an end cap attached to said slider and including at least one lock passage formed therein, and
   a wiper including a wiping member having a channel formed therein for slidably receiving and engaging said guide rail, and including at least one catch extended therefrom for engaging with said at least one lock passage of said end cap and for anchoring and positioning said wiper to said end cap, and including at least one spring-biased latch extended from said wiper for resiliently engaging with said end cap and for detachably anchoring and positioning said wiper to said end cap without tools, and
   said end cap including at least one conduit formed therein and communicating with said at least one lock passage of said end cap for forming a lock shoulder between said at least one lock passage and said at least one conduit of said end cap and for engaging with said at least one catch of said wiper.

* * * * *